United States Patent
Congdon et al.

(10) Patent No.: US 6,567,403 B1
(45) Date of Patent: May 20, 2003

(54) VIRTUAL-CHASSIS SWITCH NETWORK TOPOLOGY

(75) Inventors: Paul T. Congdon, Granite Bay, CA (US); James E. Lucari, Meadow Vista, CA (US); Stanely W. Takata, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/070,451

(22) Filed: Apr. 30, 1998

(51) Int. Cl.[7] .............................................. H04L 12/56
(52) U.S. Cl. ....................................... 370/389; 370/392
(58) Field of Search ................................. 370/218, 244, 370/250, 389, 396, 392, 426, 427

(56) References Cited

U.S. PATENT DOCUMENTS

| | | | | |
|---|---|---|---|---|
| 4,538,033 A | * | 8/1985 | Bruce et al. .................. | 179/175 |
| 4,979,100 A | * | 12/1990 | Markris et al. .............. | 364/200 |
| 5,724,347 A | * | 3/1998 | Bell et al. ................... | 370/58.1 |
| 5,896,379 A | * | 4/1999 | Haber .......................... | 370/390 |
| 5,949,788 A | * | 9/1999 | Friedman et al. ........... | 370/431 |
| 5,959,989 A | * | 9/1999 | Gleeson et al. ............. | 370/390 |
| 6,023,471 A | * | 2/2000 | Haddock et al. ............ | 370/426 |
| 6,058,116 A | * | 5/2000 | Hiscock et al. ............. | 370/401 |
| 6,363,077 B1 | * | 3/2002 | Wong et al. ................. | 370/422 |

* cited by examiner

Primary Examiner—Alpus H. Hsu
Assistant Examiner—Toan D. Nguyen

(57) ABSTRACT

A "virtual-chassis" topology network includes three or more "front-plane" switches and two or more "back-plane switches". Front-plane switches can be added to increase the number of ports available for connecting network segments; port count can be exchanged for bandwidth by adding more back-plane switches. The virtual-chassis topology relies on an asymmetrical trunk mode in which each front-plane switch is operating in trunk mode, while the back-plane switches are not. The number of ports per trunk equals the number of back-plane switches so that each front-plane switch is coupled to every back-plane switch (and vice versa). Each back-plane switch is only coupled to front-plane switches, while the untrunked ports of front-plane switches are available for links to network segments. In this topology, every node device (belonging to a segment connected to a front-plane port) is separated by at most three switches from any other node device (also belonging to a segment connected to a front-plane port). The topology is fault-tolerant in that, if any link between the front plane and the back plane is broken, or if an entire back-plane switch fails, the network can reroute packets to avoid the broken link or links. Without impairing performance, the topology can be expanded so that the number of ports available to network segments is almost the square of the number of ports per front-plane switch. The availability of the virtual-chassis topology allows a network user to acquire even a single switch with the confidence that it will remain useful as the network expands.

8 Claims, 4 Drawing Sheets

VIRTUAL-CHASSIS SWITCH NETWORK TOPOLOGY

BACKGROUND OF THE INVENTION

The present invention relates to computer networks and, more particularly, to computer networks incorporating network switches.

A major objective of the invention is to provide a high-performance network that can be initiated economically on a small scale and then expanded as needed.

Much of modern progress is marked by the proliferation of computers, and with their proliferation has come the need for computers to communicate with each other. Computer networks link computers and peripherals to facilitate their mutual communication. As the number of computers and peripherals increases, networks must expand. Simple peer-to-peer networks are superceded by networks that use network-specific devices (e.g., hubs, switches, routers) to forward data packets (frames) from one node device (e.g., computer, peripheral) to another.

The simplest network-specific device is a repeater, which regenerates a received signal to compensate for signal degradation over distances. A hub is a multi-port repeater, transmitting a received signal out all ports other than the one at which it was received. A hub can accommodate as many node devices (e.g., computers, printers) as it has ports. To accommodate greater numbers of devices, multiple hubs can be used and linked to each other. However, since each hub is broadcasting every received signal, the burden on network bandwidth can be significant.

Switches (including 2-port switches called "bridges") selectively retransmit received data, thereby reducing the bandwidth burden relative to hubs. Each port of a switch can be coupled a network segment. A "network segment" is a portion of network in which all transmissions are receivable by all included node devices, as well as any interconnecting hubs.

The operation of a typical switch conforms to an IEEE 802 standard, according to which switches handle "layer 2" packets. Each layer 2 packet consists of a 48-bit destination "media access control" (MAC) address, a 48-bit source MAC address, control information, and data. The source and destination addresses identify network devices. Switches selectively forward packets by analyzing the destination address, and switches learn the location of network devices by examining the source address. The learning function is defined by IEEE Standard 802.1D.

A switch conforming to the IEEE 802.1D learning bridge standard checks its forwarding database to determine if the destination address of a packet has been mapped to a port of the switch. The forwarding database includes mappings between the source addresses of packets previously received and the ports at which those packets were respectively received. If the destination address has been mapped, the packet is forwarded out the port associated with the destination address. If the destination address has not been mapped to a port, the packet is flooded, i.e., transmitted out all ports other than the one at which the packet was received, so that it reaches all possible network destinations.

If a network expands to the point where the required number of ports exceeds those available, there are three possibilities. The first is to replace the switch with a switch with more ports. The second is to increase the number of ports in a switch. The third is to add additional switches to the network. The first solution, replacement, is obviously wasteful.

The second solution, adding ports, only applies to certain expandable switches that involve a relatively high expense per port in the minimal configurations that might be preferred at the early stages of a network's growth. For example, a network chassis might include a backplane on which slots are mounted for several switch cards. Each switch card might have four ports. Buying an initial four-port chassis-based switch can be expensive because the chassis and backplane are included. The additional port cards tend to be proprietary, and therefore more expensive than their manufacturing costs would imply.

The third solution, adding switches, is economically attractive in that the number of ports can be scaled almost linearly with the number of switches. For example, two twelve-port switches can provide up to twenty-two ports for network segments, with one port on each switch being used for communicating with the other switch. An additional advantage of adding switches to a network rather than adding ports to a switch is that the maximum distance between network segments increases. For example, if the maximum recommended cable length is 100 meters, then in a one-switch network, network segments can be at most 200 meters apart. In a two-switch network, this limit is raised to 300 meters.

Communication bandwidth is an issue when multiple switches are used. In a chassis-type switch, a common backplane provides for intercard communication. The bandwidth provided by the backplane can be readily designed to handle the maximum load provided by a full set of network cards. However, where a single network cable couples separate switches, that cable's bandwidth can be exceeded easily. In an extreme example using two 12-port switches, eleven pairs of network nodes could compete for bandwidth over a single cable connecting the two switches. "Trunking" is an approach to increasing inter-switch bandwidth that involves using more than one pair of ports for inter-switch communication. In related-art FIG. 1, three ports PA1, PA2, and PA3 of one switch SWA can be respectively coupled to three ports PB1, PB2, PB3 of another switch SWB to define a trunk TRK and triple the available inter-switch bandwidth. The remaining ports PA4, PA5, PA6, PB4, PB5, PB6 can be coupled to other unique network segments.

For trunking to work, normal switch operation must be modified. Accordingly, proposed IEEE standard 802.3 defines a special "trunk mode". In the foregoing example, "physical" ports PA1, PA2, and PA3 collectively define a "logical" trunk TPA; likewise, physical ports PB1, PB2, and PB3 collectively define a logical trunk TPB.

When a packet with an unknown destination is received by switch SWA, flooding it out all physical "trunked" ports PA1, PA2, PA3 of its trunk TPA would cause switch SWB at the other end of the trunk to receive the packet on all its trunked ports PB1, PB2, PB3. If it responded in a like manner, switch SWB would flood multiple replicas of the packet back to switch SWA, which would flood packets again to switch SWB. Thus, a network loop would be formed, tying up network bandwidth unless and until some network fault handling procedure intervened. Furthermore, the redundant transmission would offset some of the additional bandwidth that trunking is intended to provide. Accordingly, trunk mode includes a "flood-reduction" procedure to ensure no packet is flooded out more than one physical port of a trunk.

In addition, the proposed IEEE standard 802.3 provides for a load-balancing procedure. The theoretical limit of bandwidth that increases linearly with the number of trunk lines can only be approached if the communications load is evenly distributed among the trunk lines. To help ensure even distribution, the normal learning procedure of mapping unknown source addresses to the trunked port at which a packet is received is replaced in trunk mode by a "trunk-load-balancing" procedure. For example, unknown source addresses can be mapped to trunked ports in a round-robin manner; thus, when a packet with an unknown source address is received at a trunk port, the source address may be mapped to the physical port at which the packet was received, but it may also be mapped to one of the other physical ports in the trunk. (A switch in trunk mode maps an unknown source address received at a non-trunk port to that port, just as it would in normal mode.) Alternatives to the round-robin procedure include random port selection and load-based port selection.

The main cost of trunking is the loss of ports for connecting segments. For example, two 12-port switches with a three-line trunk have 18 lines for coupling network segments, as opposed to 22 for switches coupled by one line. However, in principle, the objective of a scalable network using standard switches while maintaining satisfactory inter-switch bandwidth is achieved.

While trunking ameliorates the bandwidth issue, other issues, such as latency and vulnerablility to faults, remain. If switches added to increase port count (as in the third solution described above) are arranged in series, some data packets may have to traverse every switch in the series to reach their destinations. Each switch introduces a delay (latency) in the traversal. If the accumulated latency exceeds network specifications, network errors can be introduced that impair and/or disrupt network activity. Furthermore, if a switch near the middle of the series fails, a large percentage of network communications pathways will be broken.

The maximum number of switches that must be traversed for a given number of switches can be reduced by using network topologies other than serial topologies. In a star topology, for example, outer switches can be coupled to each other through a central switch. However, the number of outer switches that can be accommodated by a central switch decreases in inverse proportion to the degree of trunking, and the port count available for connecting network segments is reduced by even more.

For example, using all 12-port switches without trunking, twelve outer switches with eleven ports each available for connecting network segments allow up to 132 network segments to be connected. If two-line trunks are provided for each inter-switch connection, a maximum of six outer switches with ten available ports permits a maximum of 60 network segments to be interconnected. Also, in the star topology, if the central switch fails, there will be no inter-switch communication. Generally, each topology must be evaluated for port utilization, bandwidth, vulnerability to switch failure, complexity (that might lead to accidental loop formation), and other factors.

What is needed is an approach to networks that allows a modest cost for installations that are initially small, but allow cost-effective expansion as the network grows. As the network grows, appropriate inter-switch bandwidth must be maintained, latencies kept within network specifications, a large maximum distance between nodes should be achieved, and a reasonable level of fault tolerance should be provided.

SUMMARY OF THE INVENTION

The present invention provides a "virtual-chassis" topology that can accommodate a wide range of network requirements. The topology includes multiple "virtual front-plane" switches to which network segments are coupled, and plural "virtual back-plane" switches, each of which interconnects all the front-plane switches. Each front-plane switch is coupled to all of the back-plane switches. The ports of each front-plane switch that are coupled to back-plane switches are operated in trunk mode. Whereas the related art described in the background section above concerned "symmetric" trunking, the present invention provides for asymmetric trunking in that the back-plane ports are not trunked, or at least are not trunked to the same degree as the front-plane switches.

The present invention provides for certain "switch-specific" protocol packets that are not subject to the trunk-load-balancing procedure and the trunk-flood-reduction procedure. Such protocol packets can be identified, for example, by their inclusion of a switch specific destination address (so that they are read and not forwarded by the receiving switch).

The switch-specific protocol packets can include "switch-to-switch" protocol packets that have the MAC address of the originating switch port as its source address. A "switch-identification" packet is a type of switch-to-switch protocol packet in which the data to be read by a receiving switch specifies an internet protocol (IP) address for the source switch and identifies the source as a virtual-chassis compatible switch. If such a switch-to-switch protocol packet with an unknown source address is received at a trunk port, (typically, it is a front-plane switch receiving a protocol packet from an originating back-plane switch), the source address is mapped to the receiving port (not according to the trunk-load-balancing procedure, but as it would be in normal mode). Thus, for example, a network administration station trying to access a back-plane switch will succeed as a matter of course.

"Database-concordance" packets constitute another class of switch specific packets that are used to ensure concordance of the forwarding databases of the back-plane switches. When a front-plane switch, in response to reception of a packet with an unknown source address at a non-trunk port, updates its forwarding database, it can generate a database-concordance packet that replicates the source address of the received packet, but replaces the original destination address with a switch-specific destination address.

The database-concordance packet can be flooded out all the physical ports of a trunk, with the optional exclusion of the physical port through which the original packet was received. (This flooding out trunk ports can be considered an exception to the trunk-flood-reduction procedure.) Thus, every source address learned by any back-plane switch is learned by all the back-plane switches. As an enhancement, database concordance packets can be generated when a mapping is removed from a (front-plane) forwarding database (for example, due to aging).

The present invention provides for a "database-migration" packet, a specific type of switch-to-switch protocol packet, to be generated by a back-plane switch in response to a detection of a broken link at one of its ports. Such a broken link can be detected by a nonconformance to a (hardware) layer 1 protocol. In response to such a detection, a back-plane switch can generate and flood out all of its ports one or more database migration packets. Each database migration packet specifies a switch-specific destination address and lists addresses mapped to the port at the broken link. A front-plane switch receiving such a packet can then update its forwarding database so that none of the listed addresses are mapped to the physical trunk port connected to the originating back-plane switch. This migration effects a "detour" around the broken link.

The present invention provides for automatic, programmed, and/or manual switch configuration of a switch for front-plane or back-plane use. This prevents superfluous protocol packets from being generated that would reduce network bandwidth and could disrupt activity in a network that is not implementing a virtual-chassis topology. Alternatively, some non-disruptive superfluous protocol packets can be tolerated. However, the database-concordance packets would be disruptive in the context of symmetric trunking so that some kind of topology specific mode selection is required. To the end of automating this mode selection, a switch can distinguish symmetric trunking from asymmetric trunking according to the number of different IP switch addresses received.

The present invention allows a user to buy a single switch to implement a network with the confidence that that switch can be supplemented with other similar switches to meet network growth requirements. Thus, the user can avoid the expense of starting with a physical chassis switch from the beginning. Furthermore, while a physical chassis switch limits the distance between segments to two cable lengths, the virtual-chassis topology allows distances between segments of four cable lengths.

The invention provides the bandwidth advantages of symmetric trunking, but straightforwardly maintains latencies within network limits (since packets traverse a maximum of three switches in the virtual chassis). In contrast to the star topology, bandwidth can be increased with only a modest cost in available port count. A serendipitous benefit is fault tolerance: loss of a back-plane switch affects only bandwidth, while loss of a front plane switch decouples only the segments directly coupled to it from the rest of the network. These and other features and advantages of the present invention are detailed below with reference to the following figures.

DESCRIPTION OF THE PREFERRED EMBODIMENTS

Figure 1:
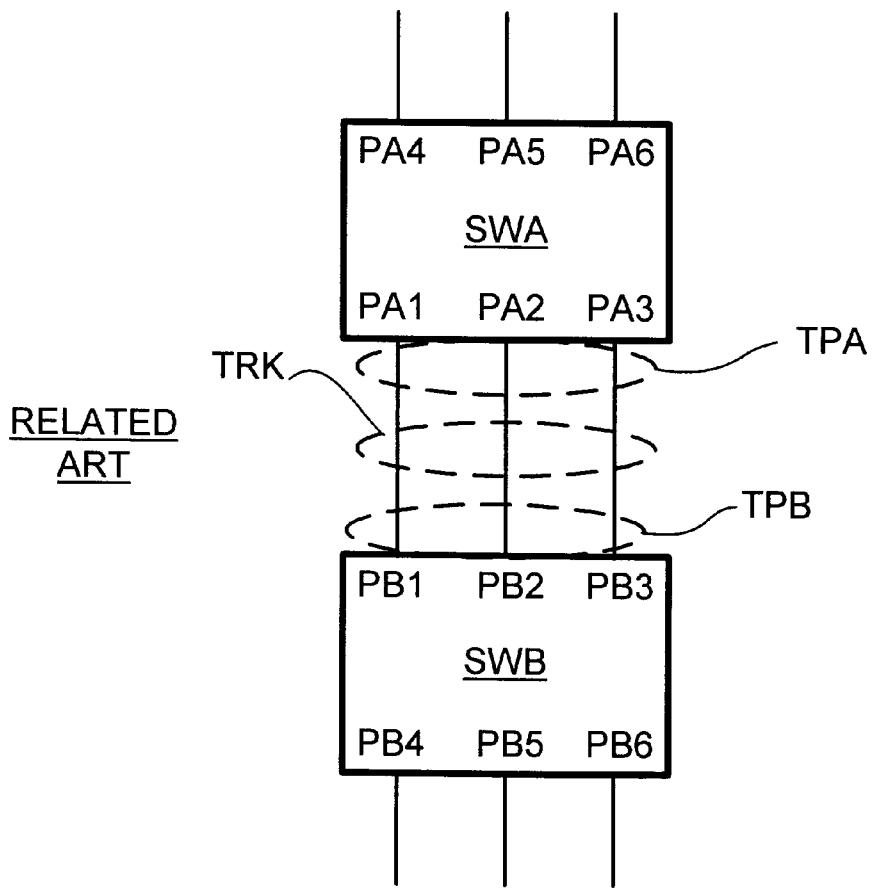
FIG. 1 is a schematic of a network in which two switches are trunked in accordance with related art.
Figure 2:
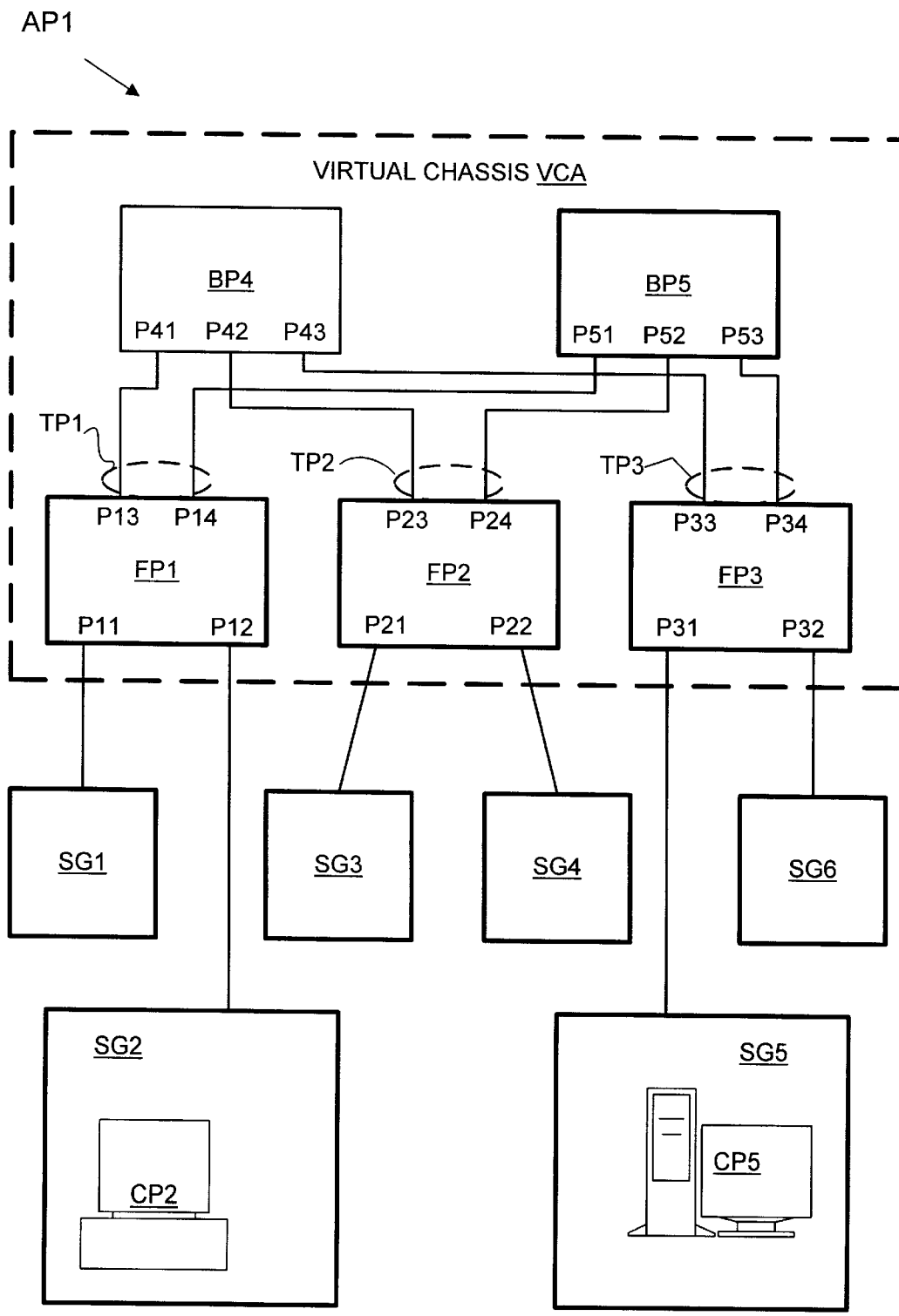
FIG. 2 is a schematic of a computer network employing a virtual-chassis topology in accordance with the present invention.

A computer network AP1 having a virtual-chassis topology in accordance with the present invention is shown in FIG. 2. A virtual chassis assembly VCA comprises five "virtual-chassis topology" switches optimized for a virtual-chassis topology, three front-plane switches FP1, FP2, and FP3, and two back-plane switches BP4 and BP5. All five switches are basically similar, but the front-plane switches and the back-plane switches operate in different modes. The five switches have twelve ports each, but only those ports being used in links are shown in FIG. 1. By adding similar switches, nine front-plane switches could be added to increase proportionally front-plane port count, while port count can be exchanged for increased bandwidth by adding back-plane switches.

Network AP1 comprises six network segments SG1–SG6. Each of these segments includes a conventional arrangement of node devices and hubs. For reference in examples, segment SG2 is shown including a computer CP2, and segment SG5 is shown including a computer CP5. Each segment is linked to the virtual front plane, e.g., one of the front-plane switches, of virtual chassis VC as follows: segment SG1 to port P11 of front-plane switch FP1; SG2 to P12 of FP1; SG3 to P21 of FP2; SG4 to P22 of FP2; SG5 to P31 of FP3; and SG6 to P32 of FP3. Thus, segments SGG and SG2 can communicate with each other through front-plane switch FPF, segments SG3 and SG4 can communicate through front-plane switch FP2, and segments SGG and SG6 can communicate through front-plane switch FP3. All other inter-segment communication involves the backplane of virtual chassis assembly VCA.

Each front-plane switch is linked to each back-plane switch: port P13 of front-plane switch FP1 is linked to port P41 of back-plane switch BP4; P14 of FP1 to P51 of BP5; P23 of FP2 to P42 of BP4; P24 of FP2 to P52 of BP5; P33 of FP3 to P43 of BP4; and P34 of FP3 to P53 of BP5. Front-plane switches FP1–FP3 are linked to each other only through back-plane switches BP4 and BP5; back-plane switches BP4 and BP5 are not linked directly to each other. Also, no network segment is directly linked to either back-plane switch.

Figure 3:
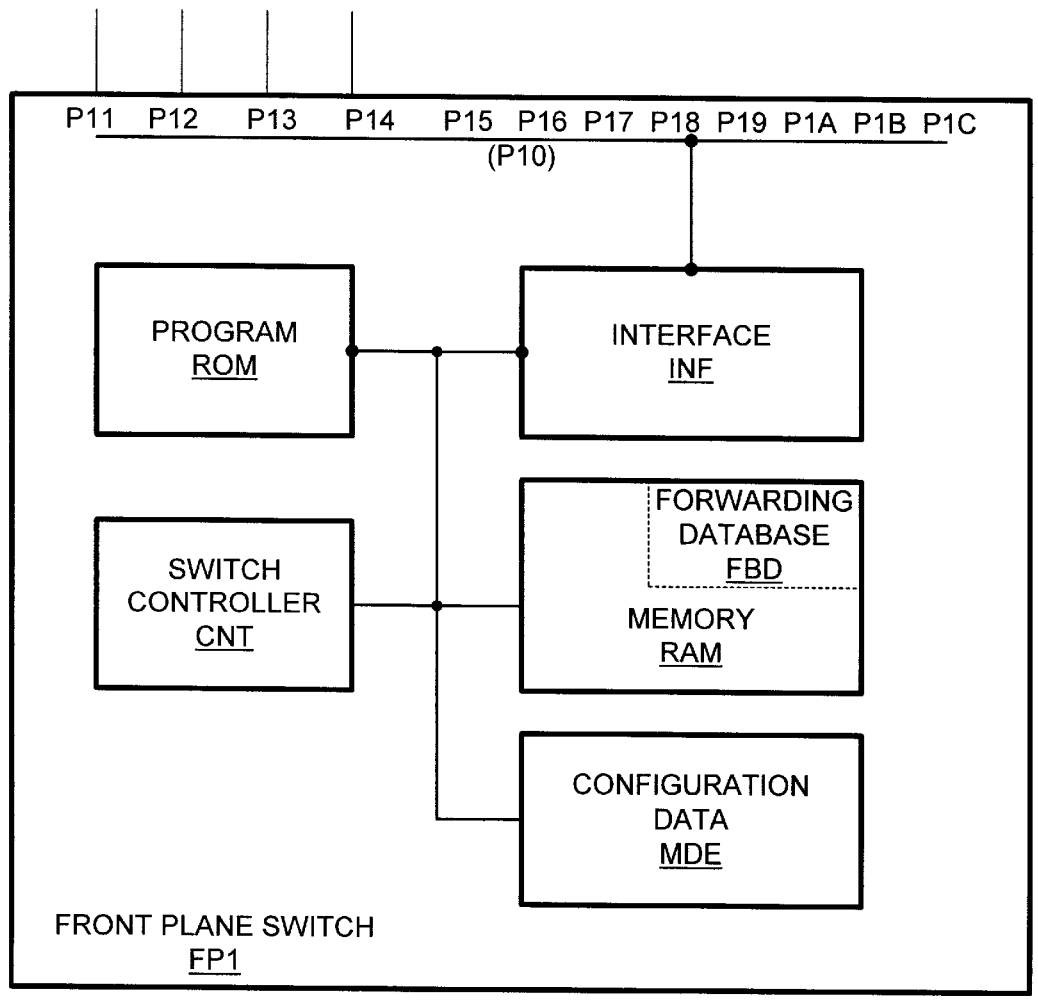
FIG. 3 is a schematic of a switch used in the network of FIG. 1.

All five switches conform to the design for switch FP1, which is shown in greater detail in FIG. 3. Switch FP1 includes twelve "physical" ports P11-P1C (hexadecimal notation). A "null port" P10 is indicated in parenthesis; it is mapped to destination addresses that are not to be forwarded from a receiving switch. A program stored in read-only memory ROM determines the general operation of switch FP1. The program is executed by switch controller CNT. Controller CNT controls interface INF, which in turn controls the forwarding of data between ports.

Controller CNT uses random-access memory RAM for temporarily storing values required by the switch program; also stored in memory RAM is a forwarding database FDB. This database provides a mapping of addresses to ports, as detailed below. Configuration data is stored in nonvolatile memory MDE; the configuration data indicates what ports are trunked and whether or not the switch is used in a virtual-chassis topology. If it is, the configuration data further indicates whether the switch is a front-plane switch or a back-plane switch.

Further details of network AP1 are described in the context of certain network operations below. Upon network initialization, each network device (including node devices, hubs, and switches) is mapped to a unique network address. Upon switch initialization and periodically during switch operation, each switch floods the network with packets that, in effect, announce that the source of the packet is a "virtual-chassis-compatible" switch. The destination for this packet is a reserved address for special handling by a receiving switch. Unlike most network addresses, this reserved address is not unique in that any switch in network AP1 can accept the packet. However, in each switch, the reserved address has a fixed mapping to the null port, so it is not forwarded by a switch.

A switch receiving a packet having the reserved address for the destination address, if it has not done so already, maps the source address of the packet to the receiving port in the forwarding database of the receiving switch. This mapping is in accordance with switch operation when the receiving port is not trunked. If the receiving port is part of a trunk (as in FIG. 2), the procedure for distributing mapping among trunked ports is effectively overridden.

When, for example, network management station CP2 tries to access back-plane switch BP5, the forwarding database FDB of front-plane switch FP1 properly indicates that back-plane switch BP5 is linked via port P14. If the normal trunking procedure were not bypassed, there would be a likelihood that the forwarding database of front-plane switch FP1 would be mapped to port P13. In this case, network management station CP2 would not be able to access back-plane switch BP5 (unless alternative provisions are made).

When network administration station CP2 sends a packet to computer CP5, the packet is received by port P12 of front-plane switch FP1. Controller CNT checks the source address in the packet header that indicates that computer CP2 is the source of the packet received at port P12. If station CP2 is not already represented in forwarding database FDB of switch FP1, then it is mapped to port P12 in forwarding database FDB.

Controller CNT of switch FP1 also checks the packet header for the packet destination. If computer CP5 is not represented in forwarding database FDB, then switch FP1 floods the packet out port P11 and one of port P13 or P14 as selected by the trunk-mode load-balancing procedure. If it is P14, for example, then the packet reaches back-plane switch BP5. In this case, switch BP5 updates its forwarding database to indicate that computer CP2 is associated with port P51.

In the meantime, front-plane switch FP1 generates a "database concordance" packet with the switch-specific destination address that indicates the update to forwarding database FDB of front-plane switch FP1. This packet is transmitted out both trunked ports so that both back-plane switches BP4 and BP5 receive the update. This packet has no effect on back-plane switch BP5, since its forwarding database already has computer CP2 to port P51. (Accordingly, the concordance procedure could be refined by not sending the concordance packet to the switch to which the original packet was forwarded.)

The update packet received by back-plane switch BP4 causes its forwarding database to map computer CP2 to port P41. Since the switch-specific address is mapped to the null port, the update packets are not forwarded out the back-plane switches. To ensure that the back-plane switches are updated, the concordance packet can be sent multiple times.

Back-plane switch BP5, which is not trunked, floods the packet originated by computer CP2 out ports P52 and P53 (and not out port P51 via which the packet was received) because computer CP5 is not represented in its forwarding database. Front-plane switches FP2 and FP3 both receive the packet and both flood the packets out the non-trunked ports because computer CP5 is not represented in their forwarding databases. The packet replica transmitted from port P31 of front-plane switch FP3 reaches network segment SG5 and computer CP5.

Both front-plane switches FP2 and FP3 update their forwarding databases: switch FP2 associates computer CP2 with port P23 or port P24 according to the trunk load-balancing algorithm; and switch FP3 associates computer CP2 with port P33 or port P34 according to the trunk load-balancing algorithm. Since the packet was received at a trunked port, no update packet is generated.

If computer CP5 sends a reply packet, it will be received at port P31 of front-plane switch FP3. Switch FP3 then updates its forwarding database by mapping computer CP5 to port P31 in its forwarding database. Subsequently, switch FP3 transmits database update packets to the back-plane switches to ensure that their forwarding databases are in concordance. Switch FP3 locates the destination address (computer CP2) of the reply packet in its forwarding database and finds it mapped, for example, to port P33. Accordingly, the reply packet is forwarded to back-plane switch BP4. Back-plane switch BP4 has mapped computer CP2 to port P41 so that the reply packet is forwarded to front-plane switch FP1. Front-plane switch FP1 has mapped computer CP2 to port P12 so that the reply packet is forwarded to segment SG2 and thus to computer CP2.

Back-plane switch BP4 has mapped computer CP2 to port P41 by virtue of the database concordance procedure utilizing the switch specific network address. Without this database-concordance procedure or a substitute therefor, switch BP4 would not have mapped computer CP2 to a port (since the original packet did not traverse back-plane switch BP4). In that case, BP4 would have to transmit the reply packet out both ports P41 and P42, generating superfluous network traffic.

This flooding would occur every time a device in segments SG3–SG6 tried to communicate with computer CP2. Furthermore, without the concordance procedure, switch BP5 would never create an entry in its forwarding database for computer CP5; as a result, all transmissions from segments SG1–SG4 to computer CP5 would be flooded. Thus, the concordance procedure provides for much more efficient utilization of network bandwidth.

The concordance procedure applies not only when entries are added to a forwarding database, but also when entries are removed from the forwarding database. Each switch embodies an aging. criterion for removing old entries from a forwarding database. The aging process addresses situations where a network device is removed or moved in a network. When a front-plane database entry is removed, update packets are transmitted to the back-plane switch so that they can remain consistent.

In the event a link between the front plane and the back plane is broken, network AP1 can reroute packets. For example, if the link between port P13 of front-plane switch FP1 and port P41 of back-plane switch BP4 is broken, then communications that would have relied on the link must be provided a "detour".

Communications from front-plane switch FP1 to another front-plane switch via back-plane switch BP4 can be handled by a standard trunk-mode procedure. Once front-plane switch FP1 determines the link is broken, it can simply change the addresses mapped to port P13 to port P14. Packets that would have been forwarded through back-plane switch BP4 are forwarded through back-plane switch BP5. Due to the database concordance, back-plane switch BP5 can forward the packets as back-plane switch BP4 would have, had the link between port P13 and port P41 not been broken.

Communications from back-plane switch BP4 to front-plane switch FP1 cannot simply be redirected by back-plane switch BP4. Instead, the redirection must be accomplished at the front-plane switch, e.g., switch FP3, from which back-plane switch BP4 received the packet. To this end, back-plane switch BP4 sends a database migration packet out its ports P42 and P43 that are part of intact links. Because the migration data may exceed packet capacity, multiple migration packets can be sent. The source address of the packet indicates switch BP4, while the destination address is the switch-specific address. The receiving front-plane switches do not forward the packet, but decode the data portion. The data portion indicates one, or more, or all of addresses that switch BP4 had mapped to the port (P41) at the broken link.

The receiving front-plane switches FP2 and FP3 then remap any of these addresses that were mapped to the port associated with the broken link. In the case of switch FP2, the remapping is from port P23 to port P24, while in the case of switch FP3, the remapping is from port P33 to port P34. Addresses not listed in the packet are not remapped. Addresses not mapped to a port connected to the back-plane switch at which the link is broken are not remapped.

Not all communication involving the back-plane switch BP4 at the broken link is prevented. For example, segment SG6 can still communicate with segments SG4 through front-plane switch FP3, back-plane switch BP4, and front-plane switch FP2. By listing only the addresses associated with the defective link, the remapping procedure preserves the bandwidth made available by intact links to the same back-plane switch BP4. Thus, a single broken link between the front-plane and the back-plane results in a loss of bandwidth for the addresses associated with that link, but not in a stoppage of communication.

Figure 4:
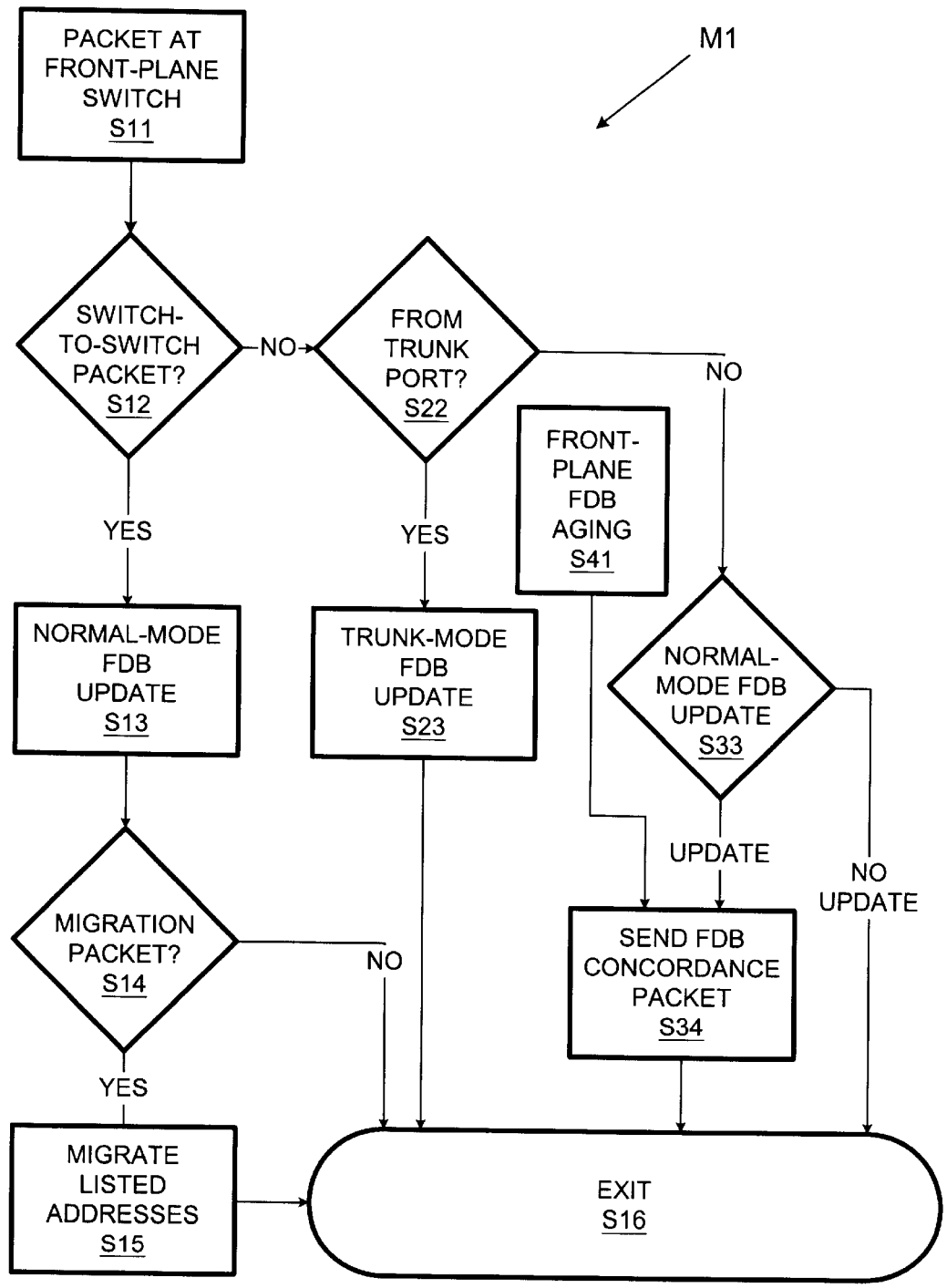
FIG. 4 is a flow chart of a database-concordance method used by the network of FIG. 1.

A method M1 of the invention as implemented by a front-plane switch is flow charted in FIG. 4. A packet is received by a front-plane switch at step S11. At step S12, the packet is examined as necessary to determine if it is a switch-to-switch protocol packet. More specifically, the destination address is examined to see if it is switch specific. This suffices where the switch is configured as a front-plane switch. Otherwise, the switch can examine the packet contents to exclude the switch-specific case of a received concordance packet.

If the packet is a switch-to-switch protocol packet, the forwarding database is updated at step S13 as dictated by normal mode learning. If the source address is known, no update occurs. If the source address is unknown, it is mapped to the port at which the packet was received.

The contents of the switch-to-switch protocol packet are examined at step S14 to determine whether or not it is a database migration packet (generated by a back-plane switch in response to a broken link). If it is not, then method M1 exits to step S16. If it is, then any of the listed addresses mapped to the trunked port at which the packet was received are migrated to other ports on the same trunk. (If the port is not trunked, no action is taken.)

If, at step S12, the packet is determined not to be a switch-to-switch protocol packet, step S22 determines whether or not the packet was received at a trucked port. If trunking is only used between the front and back planes, reception at a trunked port indicates reception from the backplane. Otherwise, configuration data can be used to differentiate trunks linking the front and back planes.

If, at step S22, it is determined the packet was received at a trunked port, then a trunk-mode update procedure is implemented at step S23. If the source address is not new, then no change is made to the forwarding database. If the source address is new, then it is mapped to a physical port of the trunk (at which the packet was received) according to a trunk-load-balancing procedure. For example, if a round-robin load-balancing procedure is implemented, the new address is mapped to the next port in the round robin, whether or not the packet was received at that port. Method M1 then exits at step S16.

If at step S22, it is determined that the packet was not received at a trunked port, then a normal-mode update is applied at step S33. If the address is not new, no new mapping is entered in the forwarding database. In the case of no update, method M1 exits directly to step S16. If the address is new, it is mapped to the receiving port. Then at step S34 an update packet is generated and transmitted out all the trunk ports. Alternatively, the update packet need not be transmitted out the trunk port selected for flooding the original packet. Method M1 then exits to step S16.

When, as at step 41, an entry in a front-plane forwarding database is removed due to aging, a concordance packet can be generated and forwarded out all asymmetrically trunked ports at step 34. Once again, method M1 exits to step S16.

In the preferred embodiment, the back-plane database concordance procedure is initiated by the front-plane switches and the back-plane switches are not connected to each other. In an alternative embodiment, the back-plane switches are connected to each other, either peer-to-peer or through a hub, for the purpose of maintaining coherence among their forwarding databases. In that case, each time a back-plane switch updates its forwarding database, it communicates the update to all other back-plane switches. To this end, the back-plane switches can treat the ports involved in back-plane links as special communications links. An advantage of the preferred embodiment is that all back-plane ports are available for normal network activity so that more front-plane switches can be included in the virtual-chassis topology.

The virtual-chassis topology has no applicability when there is only one front-plane switch. The virtual-chassis topology can be applied where there are only two front-plane switches, but there is no discernible advantage over a conventional serial topology. Where there are three front-plane switches, the virtual-chassis topology offers some additional fault tolerance over a serial topology.

The advantages of bandwidth and fault tolerance increase as the number of front-plane switches increases. The number of front-plane switches is limited to the number of available (not reserved for other purposes, such as intra-back-plane communications) ports on the back-plane switches; if the number of available ports differs among the back-plane switches, then the number of available ports on the back-plane switch with the fewest available ports is the maximum number of front-plane switches that can be utilized. Thus, in the illustrated embodiment using 12-port switches, network AP1 is readily expandable from three to twelve front-plane switches.

In the maximal case of twelve 12-port front-plane switches and two back-plane switches, 120 ports are available in the front plane for coupling to network segments. Thus, the illustrated virtual-chassis arrangement provides for networks with from 20 to 120 ports. However, as the number of front-plane switches increases, so does the need for greater inter-switch bandwidth. Additional back-plane switches can be added to provide this bandwidth. However, each additional back-plane switch costs one front-plane port per front-plane switch. Thus, the tradeoff between port count and bandwidth must be considered in determining the optimum number of back-plane switches.

The present invention also provides for operating back-plane switches in a "lesser" trunk mode. For example, in a system with three front-plane switches and two back-plane switches, each front-plane switch could have a four-port trunk and each back-plane switch could have two trunks of two ports each. In this case, each front-plane switch would be coupled to each back-plane switch over two links. The advantages of this subtrunking approach are: 1) greater bandwidth with fewer back-plane switches; and 2) more straightforward fault-tolerance in the event of a broken link. The main disadvantage of the subtrunking approach is that the maximum number of front-plane switches is reduced. However, the virtual-chassis topology permits using subtrunking for some links and not using subtrunking on other links.

The present invention allows for virtual-chassis topologies that incorporate switches with different numbers of ports. Also, in the preferred embodiment, all switches can be used as either front-plane switches or back-plane switches, depending on mode. The present invention also allows for modeless arrangements of switches and for dedicated front-plane and back-plane switches.

To avoid superfluous network traffic, virtual-chassis-specific protocol packets should only be generated in the context of a virtual-chassis topology, only front-plane switches should generate database concordance packets, and only back-plane switches should generate database migration packets (the switch-identification packets can be useful in any mode). To this end, specialized back-plane and front-plane modes can be configured (either manually or through programming). Alternatively, a virtual-chassis mode can be configured, and front-plane and back-plane locations can be autodetermined (for example, according to whether ports are trunked or not).

By way of autodetermination, a front-plane switch can identify itself because it is trunked and it receives switch-to-switch protocol packets from different source switches at respective physical ports of the trunk. Once identified, a front-plane switch could send a switch-to-switch protocol packet out all its trunk ports identifying itself as a front-plane switch. A switch receiving this packet would know that it was a back-place. switch. While trunk mode would have to be configured for front-plane switches, no further manual or programmed configuration would be required when migrating a switch from a non-virtual-chassis topology into a virtual-chassis topology.

The present invention allows for networks that include switches that are not in the virtual-chassis configuration. For example, in FIG. 2, network segments are coupled to the front plane. However, in addition to segments, other multi-segment network arrangements can be coupled to a virtual-chassis back plane. Furthermore, multiple virtual-chassis networks can be combined in various ways, including coupling back-plane switches to a second level back plane. These and other variations upon and modifications to the illustrated embodiment are provided for by the present invention, the scope of which is limited only by the following claims.

What is claimed is:

1. A computer network comprising:
a back-plane set of at least two network switches, each switch of said back-plane set having at least two ports; and
a front-plane set of at least three network switches, each switch of said front plane set having at least three ports including a trunk set of at least two ports operated collectively as a trunk port, each port of each trunk set being connected to at most one switch of said back-plane set, each trunk set providing connections to at least two network switches of said back-plane set, each switch of said front-plane set having at least one port coupled to a device other than a switch of the set constituted by the union of said back-plane set and said front-plane set,
wherein each switch of said front-plane set includes a controller for, when a packet with an unknown source address is received at one of its port that are not trunked, forwarding that source address to plural switches of said back-plane set coupled to said trunk port.

2. A network as recited in claim 1 wherein each switch of said front-plane set includes a controller for mapping a source address specified by a received packet:
to a switch of said back-plane set when said source address is associated with said switch of said back-plane set; and,
according to a trunk-mode bandwidth distribution procedure when said source address is not associated with a switch belonging to said back-plane set.

3. A network as recited in claim 1 wherein each of said back-plane switches includes a controller that detects when a link associated with one of its ports is broken and communicates addresses associated with that port to another switch.

4. A network switch comprising:
a set of at least three ports;
trunking means for trunking a non-exhaustive subset of said set of ports so as to define a trunk port constituted by plural trunked ports;
switch identification means for determining whether a data packet received on one of said trunked ports is from a virtual-chassis-compatible switch or from another type of device; and
a controller for mapping received source addresses to ports, said controller mapping source addresses received at one of said trunked ports from virtual-chassis-compatible switches to said trunked port, said controller mapping source addresses received at a trunked port from a device other than a virtual-chassis compatible switch according to a trunk-load-balancing procedure.

5. A network switch as recited in claim 4 further wherein said controller, when an associated forwarding database is updated regarding one of said trunked ports mapped to a switch, originates and transmits through the other of said trunked ports database update packets.

6. A network switch as recited in claim 4 wherein said database update packets identify at least one address mapping that has been removed.

7. A network switch as recited in claim 5 wherein, when a line coupled to a local port is determined to be broken, said switch originates and floods a packet indicating at least one network address associated with that local port.

8. A computer network comprising:
a back-plane set of at least two network switches, each switch of said back-plane set having at least two ports; and
a front-plane set of at least three network switches, each switch of said front plane set having at least three ports including a trunk set of at least two ports operated collectively as a trunk port, each switch of said front-plane set having a controller for allocating for transmission some packets among said ports of its said trunk set according to a load-balancing procedure, each port of each trunk set being connected to at most one switch of said back-plane set, each trunk set providing connections to at least two network switches of said back-plane set, each switch of said front-plane set having at least one port coupled to a device other than a switch of the set constituted-by the union of said back-plane set and said front-plane set.

* * * * *